W. KING.
Horse Rake.
No. 3,136. Reissued Sept. 22, 1868.
Fig. 1.
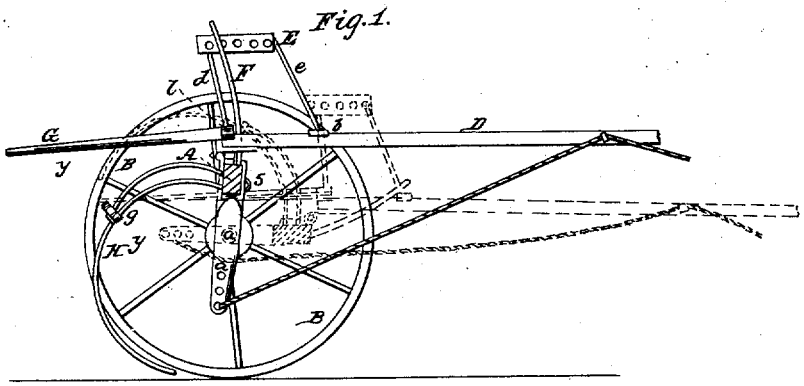
Fig. 2.
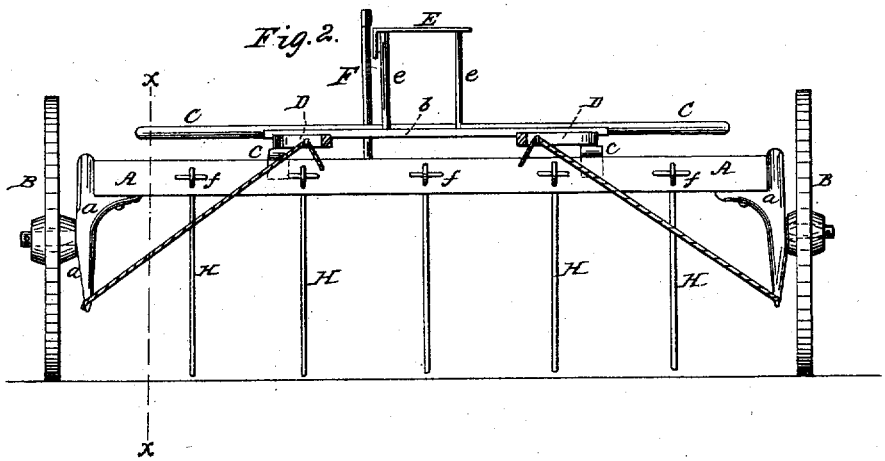
Fig. 5.
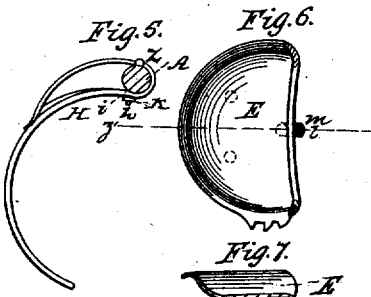
Fig. 6.
Fig. 4.
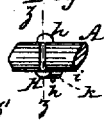
Fig. 3.
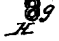
Fig. 7.
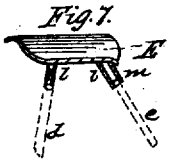
Witnesses:
T. Gus Jackson
Wm Freiwin
Inventor:
Watson King
Per Munn & Co
Attorneys
N. PETERS, Photo-Lithographer, Washington, D. C.

UNITED STATES PATENT OFFICE.

WATSON KING, OF SPRINGFIELD, ILLINOIS, ASSIGNOR TO JAMES LA F. KING AND WILLIAM W. WATSON, OF SAME PLACE.

IMPROVEMENT IN HORSE-RAKES.

Specification forming part of Letters Patent No. 63,729, dated April 9, 1867; Reissue No. 3,136, dated September 22, 1868.

*To all whom it may concern:*

Be it known that I, WATSON KING, of Springfield, Sangamon county, State of Illinois, have invented a new and Improved Horse-Rake; and I do declare that the following is a full, clear, and exact description thereof, which will enable others skilled in the art to make and use the same, reference being had to the drawings accompanying the Letters Patent and made a part of this amended specification.

In Letters Patent No. 63,729, Figure 1 is a side sectional view of my rake, taken in line *x x*, Fig. 2. Fig. 2 is a front view of the same, partly in section. Fig. 3 is a detail sectional view taken in the line *y y*, Fig. 1. Fig. 4 is a rear view of a portion of the rake-head, the tooth being cut off. Fig. 5 is a cross-section taken in the line *z z*, Fig. 4. Fig. 6 is a plan or top view of a driver's seat. Fig. 7 is a vertical section of the same, taken on the line *z z*, Fig. 6.

Similar letters of reference indicate like parts.

This invention relates to a new and improved arrangement of means for operating a horse-rake so that it will be easily adjusted to its work and be raised and lowered with the greatest facility; and the invention also relates to an improved manner of attaching the rake-teeth to the head and also to a novel construction of the teeth and to an improved method of draft; and the improvements consist—

First. In attaching the wheels to the under side of the rake-head by means of crank-arms secured to either end of the head, thereby elevating the rake-head above the center of the wheels, and in extending the said arms below the axle of the wheels, or extending arms or draft-bars down from any point along said axle and attaching the traces to these extensions, so that the horses will always tend to keep the teeth on the ground, and will easily replace the same in their working position after dumping, as soon as the rake-head is slightly moved, by a lever attached to the surface of the head near to the driver's seat.

Second. In hinging to the rear of the rake-head the butt-end of the thills, said thills being fastened to the rake-head by means thereof, on the top of which, near the said butt-ends, a long bar is attached, running parallel with the rake-head, from which a row of long straight teeth or cleaners project rearward, so that when the rake-teeth are elevated for dumping, these cleaners strip the hay off from them. By this arrangement the act of dumping is greatly facilitated, as the driver's seat, which is attached to supports extending upward from a cross-bar between the thills, and the long bar just mentioned will be over this hinge and a little to the rear of the rake-head, and as soon as the head is slightly displaced by the action of the above-mentioned lever the weight of the driver will at once bring down the thill-frame, and thus turn the rake-head, as will hereinafter be more fully shown.

Third. My improvement consists in a novel mode of attaching the teeth to the rake-head, which consists in bending the forward or upper end of each tooth over straight back on line with the tooth, or so as to form a loop, through which the rake-head is either passed and fastened by proper means, or which loop is passed through a mortise in the head, and then fastened by keys. That end of the tooth which is bent over presses upon the main body of the tooth and acts as a spring to keep the same on the ground, and is secured to it by bending end of brace around main body of tooth, or by a thimble or metal band passing around both thicknesses of the tooth end of brace and main body of tooth, as shown in the drawings.

Fourth. My improvement consists in a novel manner of attaching the driver's seat to its supports, which is done by casting three or more sockets to the bottom of the seat, into which the supporting-rods fit, thus making the attachment at once firm, simple, and cheap.

A represents the rake-head or axle, to each end of which are firmly secured the crank-arms *a a*. The wheels B are hung upon these arms below the rake-head, as seen in Fig. 2, and the traces of the harness are secured to the lower end of the arms, below the axles of the wheels, as shown.

C represents a long bar, almost as long as the rake-head, which is secured to the upper side of the thills D, near their butt-end, by means of bolts, in such a manner that a space of two or three inches will be between it and the rake-head when in a working position.

D are the thills, which are attached to the rear of the rake-head by means of the hinges *c c*, said thills being strengthened by the cross-pieces *b b*, which connect them.

The driver's seat E is supported by the rods *d* and *e*, the former fastened upon the bar C, the latter upon the cross-piece *b*.

The lever F is attached with its lower end to the upper surface of the rake-head A. A pin near its top, which works in holes or a slot in the side of the seat E, permits the driver to let the teeth more or less down.

To the rear side of the bar C are attached the straight teeth or cleaners G, which act as cleaners or scrapers, as has been already mentioned.

The wire teeth H are secured to the rake-head A by means of a mortise, which mortise is either straight or beveled, through which the loop or butt-end of the tooth is inserted and held by a key or wedge, *f*, or forming a loop, as mentioned above. The part which is bent up acts as a spring on the tooth by pressing upon its upper surface, and is secured to the tooth by bending the end around main body of tooth, or by a thimble or metal band, *g*, which surrounds both parts of the tooth, as seen in Figs. 1 and 3. The teeth H may also be fastened to the rake-head by passing the loop over and around it, securing them together by means of a staple-pin, *h*, metal plate *i*, and nut *k*, as shown in Figs. 4 and 5; but the spring which I gain by bending the wire tooth forming the loop may be acquired with the same effect by bending the trace or spring over or under and parallel with the main body of tooth and securing the end of spring with a band, as above, or by making the trace independent of the tooth and securing it to the mortise in the rake-head in any desired manner.

It will be seen by the above that when the rake is in a working position and wants to be dumped a slight forward movement of the lever F will suffice to throw the center of the hinges forward of the center of the wheels, and then the weight of the driver will be sufficient to bring the rake into the position indicated by red lines in Fig. 1, which is also the proper one for transporting the rake from one place to another. To bring the rake from this to the working position a slight pull on the lever F will give the horses enough power on the lower ends of the crank-arms *a*, which thus act as levers, to throw the teeth down without any exertion on the lever. This rake will therefore almost adjust itself to any desired position, and, as it is also very simple in construction and not liable to get out of repair, it is certainly a very valuable improvement over any now in use.

The seat E may be fastened to the supports *d* and *e* by attaching sockets *l* to the under side of the seats, into which the upper ends of the rods *d* and *e* are inserted, and by securing the sockets to the rods by means of pins *m*, all of which is completely shown in Figs. 6 and 7. By this method the seat is fastened securely and in a very simple manner, whereby cheapness and durability of construction are obtained.

I claim as new and desire to secure by Letters Patent—

1. The extension of the crank-arms *a* on each end of the rake-head below the axle, in crank form, as applied to horse-rakes, for the purposes herein shown, and in the manner described.

2. Attaching the traces to the end of the crank or draft arms *a*, which are extended below the center of the wheels from each end of the rake-head, to make these the point of draft, in the manner herein described, and for the purposes set forth.

3. The forming a spring or brace on the butt-end of the tooth, said brace being formed with or without a loop, for the purposes set forth, and in the manner described.

4. Attaching the tooth H to the rake-head A by means of a straight or beveled mortise and key, for the purposes set forth, and in the manner described.

5. Attaching the tooth H to the rake-head A by passing the loop over and around the head, for the purposes herein set forth, and in the manner described.

6. The thimble or metal band *g*, as a means of securing and completing the brace or spring formed by the connection of the end of the tooth bent over with the main body of tooth, for the purposes herein set forth.

7. The combination, with the cleaner-bar C, with thills D, cleaning-teeth G, and hinges *c*, of the rake-head A, foot-board, and seat E, all arranged substantially in the manner herein described, and for the purposes set forth.

WATSON KING.

Witnesses:

GEO. O. MARCY,
S. P. TOWNSEND.